United States Patent
Rao et al.

(10) Patent No.: US 11,898,753 B2
(45) Date of Patent: Feb. 13, 2024

(54) SYSTEM AND METHOD FOR SWEEPING LEAKED FUEL IN GAS TURBINE SYSTEM

(71) Applicant: General Electric Company, Schenectady, NY (US)

(72) Inventors: Shreekrishna Rao, Simpsonville, SC (US); Mohan Krishna Bobba, Simpsonville, SC (US); Lucas J. Stoia, Taylors, SC (US); Homayoon Feiz, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/498,705

(22) Filed: Oct. 11, 2021

(65) Prior Publication Data

US 2023/0112286 A1   Apr. 13, 2023

(51) Int. Cl.
  *F23R 3/00* (2006.01)
  *F23R 3/16* (2006.01)
  *F02C 3/04* (2006.01)

(52) U.S. Cl.
  CPC .............. *F23R 3/16* (2013.01); *F02C 3/04* (2013.01); *F05D 2240/35* (2013.01); *F23R 2900/00004* (2013.01)

(58) Field of Classification Search
  None
  See application file for complete search history.

(56) References Cited

U.S. PATENT DOCUMENTS

| 2,541,171 | A * | 2/1951 | Mcgarry | F23R 3/06 432/223 |
|---|---|---|---|---|
| 6,446,438 | B1 | 9/2002 | Kraft et al. | |
| 8,601,820 | B2 | 12/2013 | Byrne et al. | |
| 8,707,704 | B2 | 4/2014 | Simons et al. | |
| 9,267,687 | B2 | 2/2016 | Khan et al. | |
| 9,291,350 | B2 | 3/2016 | Melton et al. | |
| 9,310,078 | B2 | 4/2016 | Chen et al. | |
| 9,316,155 | B2 | 4/2016 | DiCintio et al. | |
| 9,322,553 | B2 | 4/2016 | Parsania et al. | |
| 9,383,104 | B2 | 7/2016 | Melton et al. | |
| 9,593,851 | B2 | 3/2017 | Shershnyov et al. | |
| 9,951,693 | B2 | 4/2018 | Elwasila et al. | |
| 10,228,141 | B2 | 3/2019 | Cihlar et al. | |
| 10,513,987 | B2 | 12/2019 | Hughes et al. | |
| 11,371,709 | B2 | 6/2022 | Bhagat | |
| 2006/0191268 | A1 * | 8/2006 | Widener | F23D 14/48 60/740 |
| 2009/0050710 | A1 * | 2/2009 | Myers | F23R 3/28 60/737 |
| 2013/0031906 | A1 * | 2/2013 | DiCintio | F23R 3/346 60/737 |

(Continued)

*Primary Examiner* — Edwin Kang
(74) *Attorney, Agent, or Firm* — Fletcher Yoder, P.C.

(57) ABSTRACT

A system is provided with a fuel sweep system configured to couple to a flow sleeve of a combustor along a first fuel conduit. The flow sleeve is configured to be disposed about a liner of the combustor, and the first fuel conduit is configured to extend along the flow sleeve in a compressor discharge chamber disposed about the flow sleeve. The fuel sweep system includes a first fuel sweep louver adjacent a first fuel sweep opening defined through the flow sleeve.

19 Claims, 6 Drawing Sheets

(56) References Cited

U.S. PATENT DOCUMENTS

| | | | | |
|---|---|---|---|---|
| 2014/0116053 A1* | 5/2014 | Chen | F23R 3/346 | |
| | | | 60/737 | |
| 2015/0027126 A1* | 1/2015 | Berry | F02C 7/222 | |
| | | | 60/739 | |
| 2015/0159877 A1* | 6/2015 | Stoia | F23R 3/346 | |
| | | | 60/735 | |
| 2016/0047316 A1* | 2/2016 | Melton | F02C 7/12 | |
| | | | 60/740 | |
| 2016/0265781 A1* | 9/2016 | Carnell, Jr. | F23R 3/346 | |
| 2016/0265782 A1 | 9/2016 | Bhagat et al. | | |
| 2017/0175634 A1* | 6/2017 | Hughes | F23R 3/06 | |
| 2017/0175637 A1* | 6/2017 | Hughes | F02C 7/12 | |
| 2017/0191668 A1* | 7/2017 | Hughes | F23R 3/002 | |
| 2017/0254540 A1* | 9/2017 | DiCintio | F02C 7/228 | |
| 2017/0254542 A1* | 9/2017 | Cihlar | F23R 3/34 | |
| 2017/0268784 A1 | 9/2017 | Crawley et al. | | |
| 2018/0087693 A1 | 3/2018 | Dhanasekaran et al. | | |
| 2018/0328587 A1* | 11/2018 | Gubba | F23R 3/286 | |
| 2019/0072279 A1* | 3/2019 | Natarajan | F23R 3/34 | |
| 2019/0093562 A1* | 3/2019 | Lau | F23R 3/286 | |
| 2019/0178496 A1* | 6/2019 | Jones | F23R 3/06 | |
| 2019/0178498 A1* | 6/2019 | Wilson | F23R 3/045 | |
| 2019/0218976 A1* | 7/2019 | Moura | F23R 3/50 | |
| 2019/0368734 A1* | 12/2019 | Styborski | F23R 3/06 | |
| 2020/0378604 A1 | 12/2020 | Roh | | |
| 2020/0400315 A1* | 12/2020 | Shershnyov | F23R 3/002 | |
| 2022/0404020 A1 | 12/2022 | Stoia et al. | | |

* cited by examiner

SYSTEM AND METHOD FOR SWEEPING LEAKED FUEL IN GAS TURBINE SYSTEM

BACKGROUND

The present application relates generally to gas turbine systems and, more specifically, to systems and methods for sweeping leaked fuel from one or more fuel injection systems.

A gas turbine system may include a plurality of combustors upstream from a turbine. Each combustor may include one or more fuel systems having fuel supply conduits, which may include one or more joints that can potentially leak. For example, a secondary fuel injection system may extend along a flow sleeve of a combustor and may potentially leak fuel into a chamber of a compressor discharge casing. Accordingly, a need exists for sweeping any leaked fuel in these locations, thereby avoiding any unscheduled downtime of the gas turbine system.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system is provided with a combustor having a combustion chamber, a liner disposed about the combustion chamber, a flow sleeve disposed about the liner, and a passage disposed between the liner and the flow sleeve, wherein the passage is in fluid communication with the combustion chamber. The system also includes a compressor discharge chamber disposed about the flow sleeve and a first fuel conduit disposed in the compressor discharge chamber along the flow sleeve. The system further includes a fuel sweep system having a first fuel sweep opening in the flow sleeve and a first fuel sweep louver coupled to the flow sleeve adjacent the first fuel sweep opening, wherein the first fuel sweep opening and the first fuel sweep louver are disposed along the first fuel conduit.

In certain embodiments, a system is provided with a fuel sweep system configured to couple to a flow sleeve of a combustor along a first fuel conduit. The flow sleeve is configured to be disposed about a liner of the combustor, and the first fuel conduit is configured to extend along the flow sleeve in a compressor discharge chamber disposed about the flow sleeve. The fuel sweep system includes a first fuel sweep louver adjacent a first fuel sweep opening.

In certain embodiments, a method is provided for directing a leaked fuel from a first fuel conduit through a first fuel sweep opening of a fuel sweep system into a passage between a liner and a flow sleeve of a combustor. The liner is disposed about a combustion chamber, the flow sleeve is disposed about the liner, the passage is in fluid communication with the combustion chamber, and a compressor discharge chamber is disposed about the flow sleeve. The first fuel conduit is disposed in the compressor discharge chamber along the flow sleeve, and the first fuel sweep opening is disposed in the flow sleeve. The method also includes directing the leaked fuel from the first fuel sweep opening in a flow direction along the passage via a first fuel sweep louver of the fuel sweep system. The first fuel sweep louver is coupled to the flow sleeve adjacent the first fuel sweep opening, and the first fuel sweep opening and the first fuel sweep louver are disposed along the first fuel conduit.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

One or more specific embodiments of the presently disclosed embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including,"

and "having" are intended to be inclusive and mean that there may be additional elements other than the listed elements.

As discussed below, the disclosed embodiments include systems and methods for sweeping leaked fuel from a chamber surrounding a combustor of a gas turbine engine, such that the leaked fuel is directed along a flow path into the main combustion chamber rather than remaining in the chamber. For example, embodiments of a fuel sweep system include openings and louvers to guide a flow containing leaked fuel into a head end chamber of a combustor, through fuel nozzles, and into the main combustion chamber. The fuel sweep system may position the openings and louvers at areas susceptible to fuel leakage, such as near joints of fuel conduits, low velocity areas, or any areas that fuel leakage could be a problem.

Figure 1:
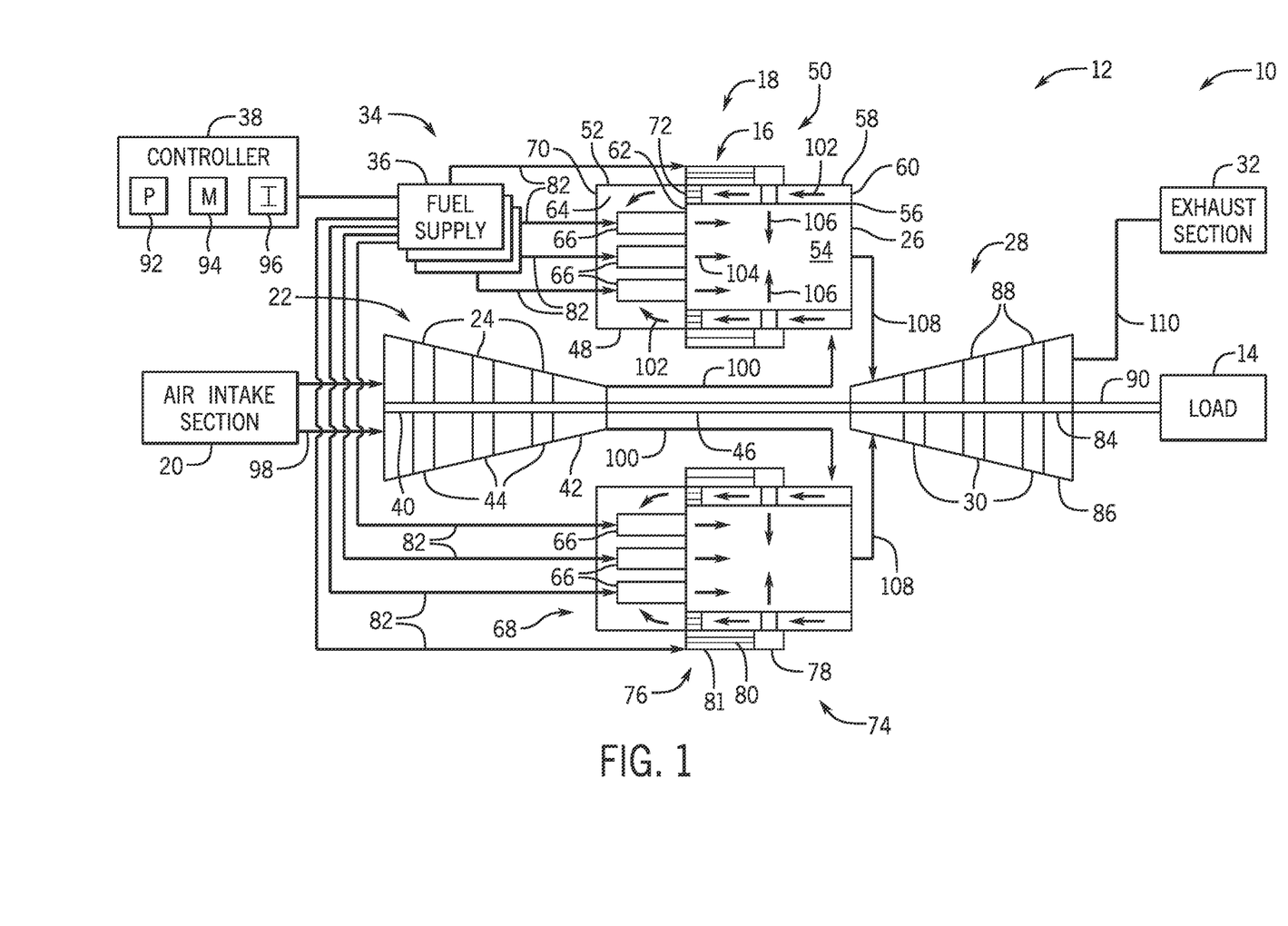
FIG. 1 is a schematic of an embodiment of a gas turbine system having a fuel sweep system for sweeping any leaked fuel from a secondary fuel injection system into a main flow path of a combustor.

FIG. 1 is a schematic of an embodiment of a gas turbine system 10 having a gas turbine engine 12 drivingly coupled to a load 14, such as an electrical generator. As discussed in further detail below, the gas turbine engine 12 may include a fuel sweep system 16 configured to direct any leaked fuel into a main flow path in a combustor section 18 of the gas turbine engine 12. As illustrated, the gas turbine engine 12 includes an air intake section 20, a compressor section 22 having one or more compressor stages 24, the combustor section 18 having one or more combustors 26, a turbine section 28 having one or more turbine stages 30, an exhaust section 32, a fuel supply system 34 having one or more fuel supplies 36, and a controller 38.

The air intake section 20 may include an air intake duct having one or more air filters, silencer baffles, anti-ice systems, and/or fluid injection systems. The compressor section 22 may include a rotor or shaft 40, a compressor casing 42 disposed about the shaft 40, and a plurality of blades 44 coupled to the shaft 40 inside the casing 42 at each of the compressor stages 24. Between each row of blades 44, a plurality of stationary blades (not shown) is attached to the compressor casing 42 to complete each compressor stage 24. In certain embodiments, the compressor section 22 may include any number between 1 and 30 compressor stages 24.

The combustor section 18 includes one or more combustors 26, such as a plurality of combustors spaced circumferentially about a shaft 46, or a continuous annular combustor disposed about the shaft 46. The combustor 26 includes a wall 48 disposed about and/or forming a combustor portion 50 and a head end portion 52. The combustor portion 50 includes a combustion chamber 54, a combustor liner or wall 56 disposed circumferentially about and partially defining the combustion chamber 54, a flow sleeve 58 disposed circumferentially about the liner 56, and a passage 60 extending between the liner 56 and the flow sleeve 58.

Each combustor 26 has multiple fuel injection systems. The head end portion 52 includes a cap plate 62 disposed as a divider between the combustion chamber 54 and a head end chamber 64, a plurality of fuel nozzles 66 of a primary fuel injection system 68 extending through the head end chamber 64, and an end plate 70 to which the fuel nozzles 66 are mounted. The combustor 26 also includes an inlet flow conditioner 72 disposed along the passage 60 adjacent to the head end chamber 64.

In addition to the primary fuel injection system 68, the combustor 26 includes a secondary fuel injection system 74 having an axial fuel staging assembly 76 with a plurality of fuel nozzles 78 and respective fuel conduits 80. Each fuel nozzle 78 receives a supply of fuel through the fuel conduit 80 outside of the flow sleeve 58. A baffle, duct, or hood 81 also may be disposed at least partially about the fuel conduit 80, lengthwise along the fuel conduit 80, and coupled to the flow sleeve 58. As discussed below, the hood 81 is configured to guide an airflow along the fuel conduit 80 and may be part of (or facilitate operation of) the fuel sweep system 16.

As discussed in further detail below, the fuel sweep system 16 is configured to sweep, or generally urge a flow of, any leaked fuel from the secondary fuel injection system 74 into the passage 60, which then directs flow into the head end chamber 64. The one or more fuel supplies 36 are configured to direct fuel flows into each of the fuel nozzles 66 of the primary fuel injection system 68 and the fuel nozzles 78 of the secondary fuel injection system 74, as indicated by arrows 82. In certain embodiments, the pressure drop across the flow sleeve 58 into the passage 60 and the airflow within the passage 60 may help to draw in a flow (including any leaked fuel) via the fuel sweep system 16. Additionally, the hood 81 disposed over the fuel conduit 80 may help to channel the airflow along the fuel conduit (i.e., constrained by walls of the hood 81 and the exterior of the flow sleeve 58), such that any fuel leaking from the fuel conduit 80 is also constrained to the interior of the hood 81, followed by urging the airflow (and any leaked fuel) into the passage 60.

The turbine section 28 includes a rotor or shaft 84, a turbine casing 86 disposed circumferentially about the shaft 84, and a plurality of turbine blades 88 coupled to the shaft 84 inside of the casing 86 in each of the one or more turbine stages 30. Between each row of blades 88, a plurality of stationary nozzles (not shown) is attached to the turbine casing 86 to complete each turbine stage 30. In certain embodiments, the turbine section 28 may include between 1 and 10 or more turbine stages 30. The shaft 84 is coupled to the shaft 40 of the compressor section 22 via the shaft 46, and the shaft 84 is coupled to the load 14 via a shaft 90. In certain embodiments, the shafts 40, 46, 84, and 90 may be integrated into one or more common shafts. The exhaust section 32 may include one or more exhaust ducts or exhaust stacks, exhaust treatment systems, silencer baffles, emissions control equipment, or any combination thereof.

The controller 38 may include one or more processors 92, memory 94, and instructions 96 stored on the memory 94 and executable by the processors 92 to perform various control functions for the gas turbine system 10. The controller 38 may receive feedback from sensors distributed throughout the gas turbine system 10. For example, the controller 38 may receive feedback from leak sensors configured to detect leakage of fuel from the primary fuel injection system 68 and/or the secondary fuel injection system 74. If fuel leakage is detected, then the controller 38 may be configured to output alerts or alarms via a computer display, a speaker, a light, or a combination thereof, the controller 38 may be configured to schedule maintenance or request servicing, and the controller 38 may be configured to shut down certain portions of the fuel injection systems 68 and 74 or the entire gas turbine system 10. As noted above, the fuel sweep system 16 is configured to help sweep away any leaked fuel, thereby avoiding an unscheduled shutdown of the gas turbine system 10.

In operation, the air intake section 20 filters and delivers an air intake into the compressor section 22 as indicated by arrows 98, the compressor section 22 compresses the intake air 98 via the one or more compressor stages 24, and the compressor section 22 delivers a compressed air into the one or more combustors 26 of the combustor section 18 as indicated by arrows 100. Each of the combustors 26 may direct the compressed air through the passage 60 between the liner 56 and the flow sleeve 58 toward the head end portion 52, as illustrated by arrows 102. In the head end portion 52, the air flow 102 may be directed into the one or more fuel nozzles 66 and mixed with fuel from the one or more fuel supplies 36, thereby providing an output of fuel and air into the combustion chamber 54 as illustrated by arrows 104. In addition, the fuel nozzles 78 of the secondary fuel injection system 74 may inject fuel into the combustion chamber 54 downstream from the fuel nozzles 66 of the primary fuel injection system 68 as indicated by arrows 106.

If any fuel leaks at the secondary fuel injection system 74, the fuel sweep system 16 sweeps the leaked fuel into the passage 60, such that leaked fuel eventually flows into the combustion chamber 54. The injected fuel (and any leaked fuel swept by the fuel sweep system 16) is configured to combust with the compressed air in the combustion chamber 54, thereby generating hot combustion gases, which are directed into the turbine section 28 as indicated by arrows 108. In the turbine section 28, the hot combustion gases drive rotation of the turbine blades 88 in each of the turbine stages 30, thereby driving rotation of the shaft 84 and, in turn, the shafts 46, 40, and 90. Eventually, the turbine section 28 discharges an exhaust gas into the exhaust section 32 as indicated by arrow 110.

Figure 2:
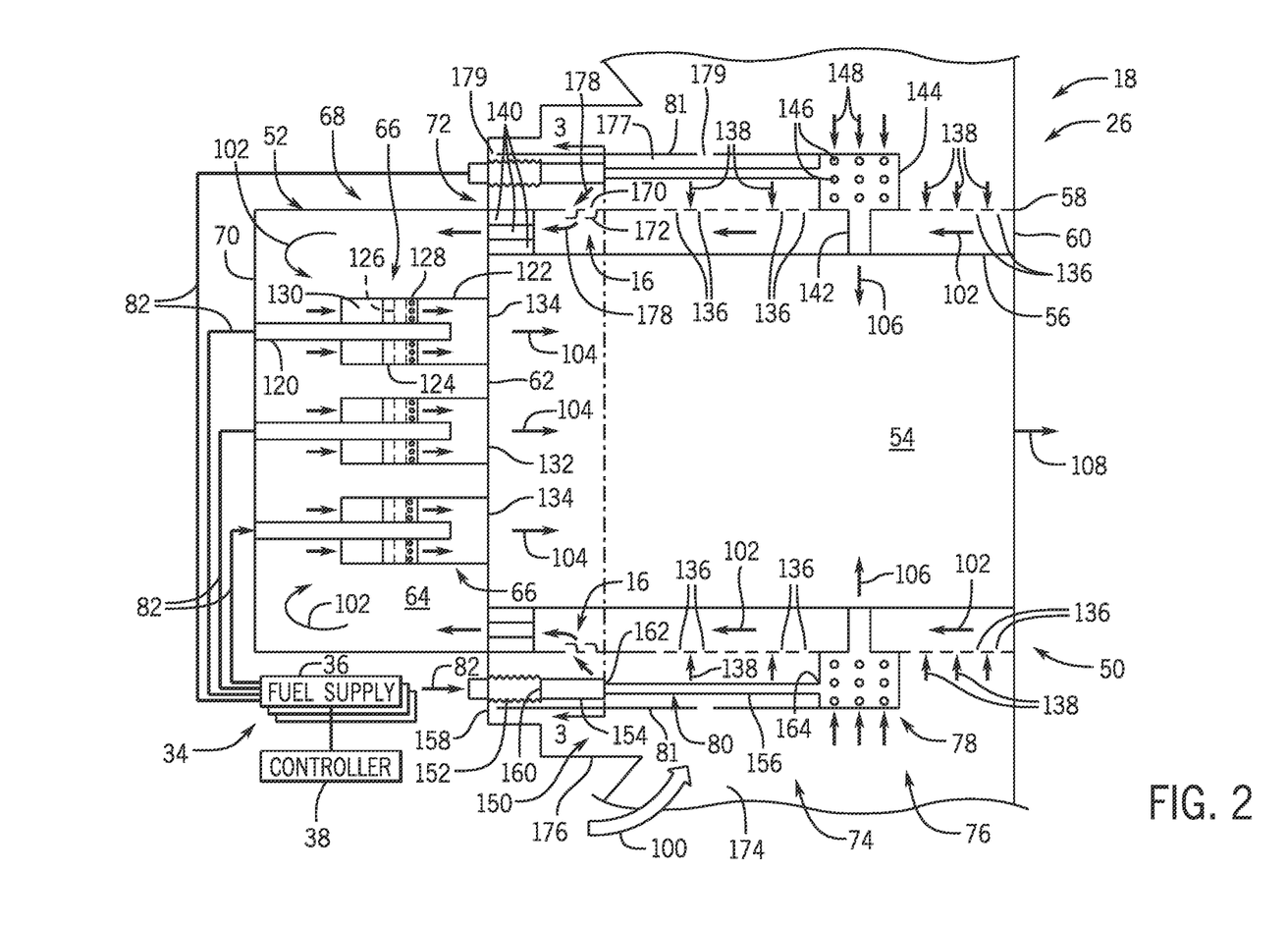
FIG. 2 is a schematic of an embodiment of the combustor, further illustrating details of the fuel sweep system along the secondary fuel injection system.

FIG. 2 is a schematic of an embodiment of one of the combustors 26 of FIG. 1, further illustrating details of the fuel sweep system 16, the secondary fuel injection system 74, and the primary fuel injection system 68. As illustrated, the fuel nozzles 66 of the primary fuel injection system 68 include a central fuel conduit 120 extending from the end plate 70 into an outer wall 122 of the fuel nozzle 66, wherein the central fuel conduit 120 may be a cylindrical or annular conduit, and the outer wall 122 may be a cylindrical or annular wall disposed coaxially with the central fuel conduit 120. Additionally, the fuel nozzles 66 may include a plurality of vanes 124 (e.g., swirl vanes) having a radial fuel passage 126 fluidly coupled to the central fuel conduit 120 and a plurality of fuel outlets 128 disposed in the vanes 124.

In operation, the one or more fuel supplies 36 are configured to direct fuel flow through the central fuel conduit 120, through the passage 126, through the fuel outlets 128, and into a flow path or passage 130 disposed between the central fuel conduit 120 and the outer wall 122. The fuel and air then mix within the fuel nozzle 66 before being injected into the combustion chamber 54, as illustrated by arrows 104. The illustrated head end portion 52 includes a central fuel nozzle 132 and a plurality of outer or peripheral fuel nozzles 134. For example, the outer fuel nozzles 134 may include 2, 3 4, 5, 6, or more outer fuel nozzles 134. Although the fuel nozzles 66 and the head end portion 52 are shown with specific features, the combustor 26 may include other types or configurations of fuel nozzles in certain embodiments.

As illustrated, the combustor portion 50 includes the liner 56 disposed about the combustion chamber 54, the passage 60 disposed about the liner 56, and the flow sleeve 58 disposed about the passage 60. The liner 56, the passage 60, and the flow sleeve 58 may be annular or another shape extending circumferentially about the combustion chamber 54. In the illustrated embodiment, the flow sleeve 58 includes a plurality of air openings 136 (e.g., air ports or perforations) disposed at a plurality of locations spaced axially and circumferentially along the flow sleeve 58, thereby facilitating entry of the compressed air 100 into the passage 60 as indicated by arrows 138. The incoming air flow 138 impinges on the liner 56 to cool the liner 56 and then flows axially (e.g., relative to a central longitudinal axis of the combustor 26) along the passage 60 between the liner 56 and the flow sleeve 58 toward the head end portion 52, as indicated by arrows 102. Prior to entering into the chamber 64 of the head end portion 52, the air flow 102 passes through the inlet flow conditioner 72 adjacent and radially outward of the cap plate 62. The inlet flow conditioner 72 may include a plurality of tubes or passages 140 arranged radially and circumferentially about the combustor 26 in the passage 60 between the liner 56 and the flow sleeve 58. The inlet flow conditioner 72 may be configured to straighten the air flow 102 prior to entry into the chamber 64 of the head end portion 52.

The axial fuel staging assembly 76 of the secondary fuel injection system 74 may include a plurality of the fuel nozzles 78, fuel conduits 80, and hoods 81, such as 2, 3, 4, 5, 6, 7, 8, 9, 10, or more of these assemblies circumferentially spaced about the exterior of the flow sleeve 58. As illustrated, the fuel nozzle 78 includes a radial nozzle or injection conduit 142 coupled to a hollow body or housing 144. The injection conduit 142 extends through the passage 60 from the flow sleeve 58 to the liner 56, wherein the injection conduit 142 is coupled to the hollow body 144 adjacent the flow sleeve 58. The hollow body 144 includes a plurality of air openings or ports 146 configured to receive a portion of the compressed air flow 100 into the hollow body 144 as indicated by arrows 148.

Additionally, the hollow body 144 is coupled to the fuel conduit 80, such that the hollow body 144 receives fuel from the one or more fuel supplies 36 and mixes the fuel with the air 148 for injection through the injection conduit 142 into the combustion chamber 54 as indicated by arrows 106.

The illustrated fuel conduit 80 includes a plurality of sections 150, such as a bellows section 152, a conduit section 154, and a conduit section 156. The bellows section 152 may be coupled to a wall 158, the conduit section 154 is coupled to the bellows section 152 at a first joint 160, the conduit section 156 is coupled to the conduit section 154 at a second joint 162, and the conduit section 156 is coupled to the hollow body 144 at a third joint 164. The illustrated joints 160, 162, and 164 may include removable joints and/or fixed joints. For example, the fixed joints may correspond to a welded joint or a brazed joint between the different sections 150. The removable joint may correspond to a threaded joint, a flanged joint with mating flanges secured with a plurality of threaded fasteners, a concentric tubular joint having an intermediate seal, or any combination thereof. For example, the outer diameters of the sections 150 may have a staggered or stepwise configuration (e.g., steps of different diameters), such that the sections 150 may fit one inside the other in a concentric manner. For example, one of the sections 150 may extend partially into an interior of another section. Accordingly, leakage may potentially occur during operation of the combustor 26 at any of these joints 160, 162, and 164. The illustrated fuel sweep system 16 is configured to draw any leaked fuel from the joints 160, 162, and 164 into the passage 60, thereby directing the leaked fuel into the chamber 64 and through the fuel nozzles 66 into the combustion chamber 54.

In the illustrated embodiment, the fuel sweep system 16 may include one or more sweep openings 170 disposed adjacent sweep louvers 172 along the fuel conduit 80 of the secondary fuel injection system 74. As illustrated, the sweep louvers 72 extend or protrude radially inward from the flow sleeve 58 into the passage 60 adjacent and upstream of the inlet flow conditioner 72, relative to the air flow 102 through the passage 60. In particular, the sweep openings 170 and the sweep louvers 172 are disposed directly along a portion of the fuel conduit 80 relatively closer to the head end portion 52 than the fuel nozzles 78. Accordingly, the sweep openings 170 and the sweep louvers 172 are configured to sweep any leaked fuel relatively close to the inlet flow conditioner 72, which directs the air flow 102 into the head end portion 52.

For example, the sweep openings 170 and the sweep louvers 172 may be disposed adjacent the conduit section 154 and the bellows section 152, which is also adjacent the joints 160 and 162 of the fuel conduit 80. The pressure difference (or pressure drop) across the flow sleeve 58 from a compressor discharge casing chamber 174 inside a compressor discharge casing 176 disposed about the combustor 26 and into the passage 60 urges (or draws) the flow through the sweep openings 170 along the sweep louvers 172 into the passage 60 as indicated by arrows 178. The flow through the passage 60 also helps to urge (or draw) the flow through the sweep openings 170 along the sweep louvers 172 into the passage 60.

Additionally, the hood 81 helps to guide an airflow along the fuel conduit 80, such that any fuel leaking from the fuel conduit 80 is carried by the airflow and contained within the hood 81 before entering the passage 60 through the sweep openings 170. As illustrated, the hood 81 is coupled to the flow sleeve 58 around the fuel conduit 80, such that the fuel conduit 80 is disposed in an interior flow path or flow passage 177 formed by walls of the hood 81 and the flow sleeve 58. The hood 81 may include one or more openings at various locations along the length of the hood 81, such as openings 179 disposed at the bellows section 152, the conduit section 154, and/or the conduit section 156. The openings 179 enable the airflow to enter the interior flow passage 177 of the hood 81, and then the hood 81 guides the airflow (and any collected fuel leakage) to the sweep openings 170. In certain embodiments, the hood 81 may extend along substantially an entire length of the fuel conduit 80 from the wall 158 to the fuel nozzle 78, only a portion of the entire length (e.g., less than or equal to 25, 50, or 75 percent) of the fuel conduit 80 from the wall 158 to the fuel nozzle 78, or the hood 81 may be excluded. The openings 179 may represent gaps between different hood sections of the hood 81, gaps at one or both axial ends of the hood 81, openings in sidewalls of the hood 81, or a combination thereof.

Figure 3:
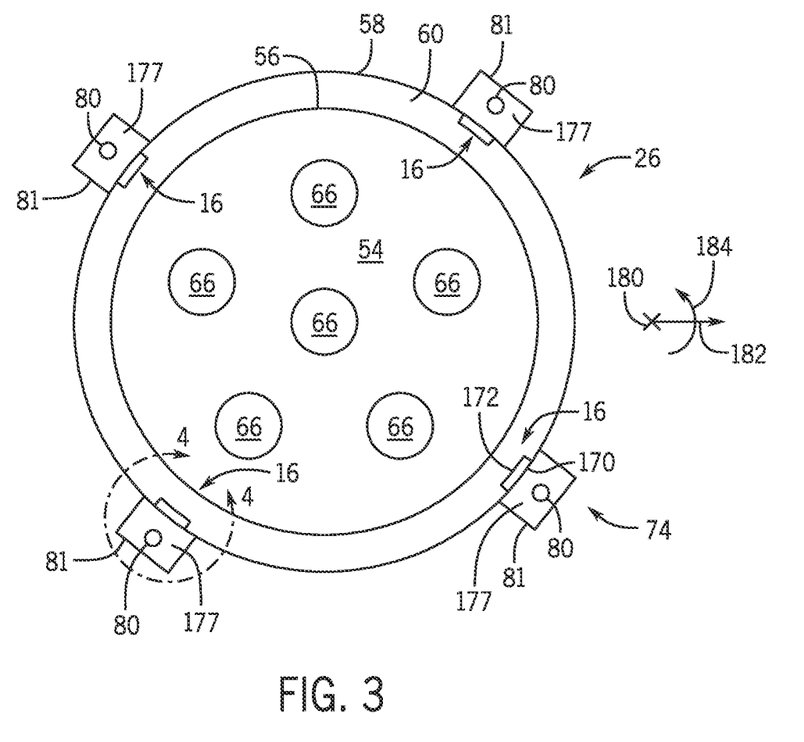
FIG. 3 is schematic view of the combustor taken along line 3-3 of FIG. 2, further illustrating an arrangement of fuel conduits, sweep openings, and sweep louvers about the combustor.

FIG. 3 is a cross-sectional schematic view of an embodiment of the combustor 26 of FIG. 2 taken along line 3-3, further illustrating an arrangement of the secondary fuel injection system 74 and the fuel sweep system 16. For purposes of discussion, reference may be made to an axial direction or axis 180, a radial direction or axis 182, and a circumferential direction or axis 184 extending circumferentially about the axial direction or axis 180. As illustrated, the liner 56 extends circumferentially about the combustion chamber 54, the passage 60 extends circumferentially about the liner 56, and the flow sleeve 58 extends circumferentially about the liner 56 and the passage 60. At different circumferential positions, the secondary fuel injection system 74 includes the fuel conduits 80. Additionally, at the same circumferential positions as the fuel conduits 80, the fuel sweep system 16 includes the sweep openings 170 in the flow sleeve 58 and the sweep louvers 172 extending radially inwardly from the flow sleeve 58 into the passage 60. Again, the sweep openings 170 and the sweep louvers 172 are configured to direct any leaked fuel from the fuel conduit 80 into the passage 60 for subsequent flow through the head end portion 52, the fuel nozzles 66, and into the combustion chamber 54. Finally, at the same circumferential positions as the fuel conduits 80, the hood 81 is disposed over each fuel conduit 80 and the corresponding sweep openings 170 and sweep louvers 172. The hood 81 helps to contain any fuel leaks and guide the airflow (including leaked fuel) into the sweep openings 170. In the illustrated embodiment, the combustor 26 includes four sets of fuel conduits 80, hoods 81, and fuel sweep systems 16. In certain embodiments, the combustor 26 may include 2, 3, 4, 5, 6, 7, 8, 9, 10, or more sets of fuel conduits 80, hoods 81, and fuel sweep systems 16, which may be spaced uniformly or non-uniformly in the circumferential direction 184 about the combustor 26.

Figure 4:
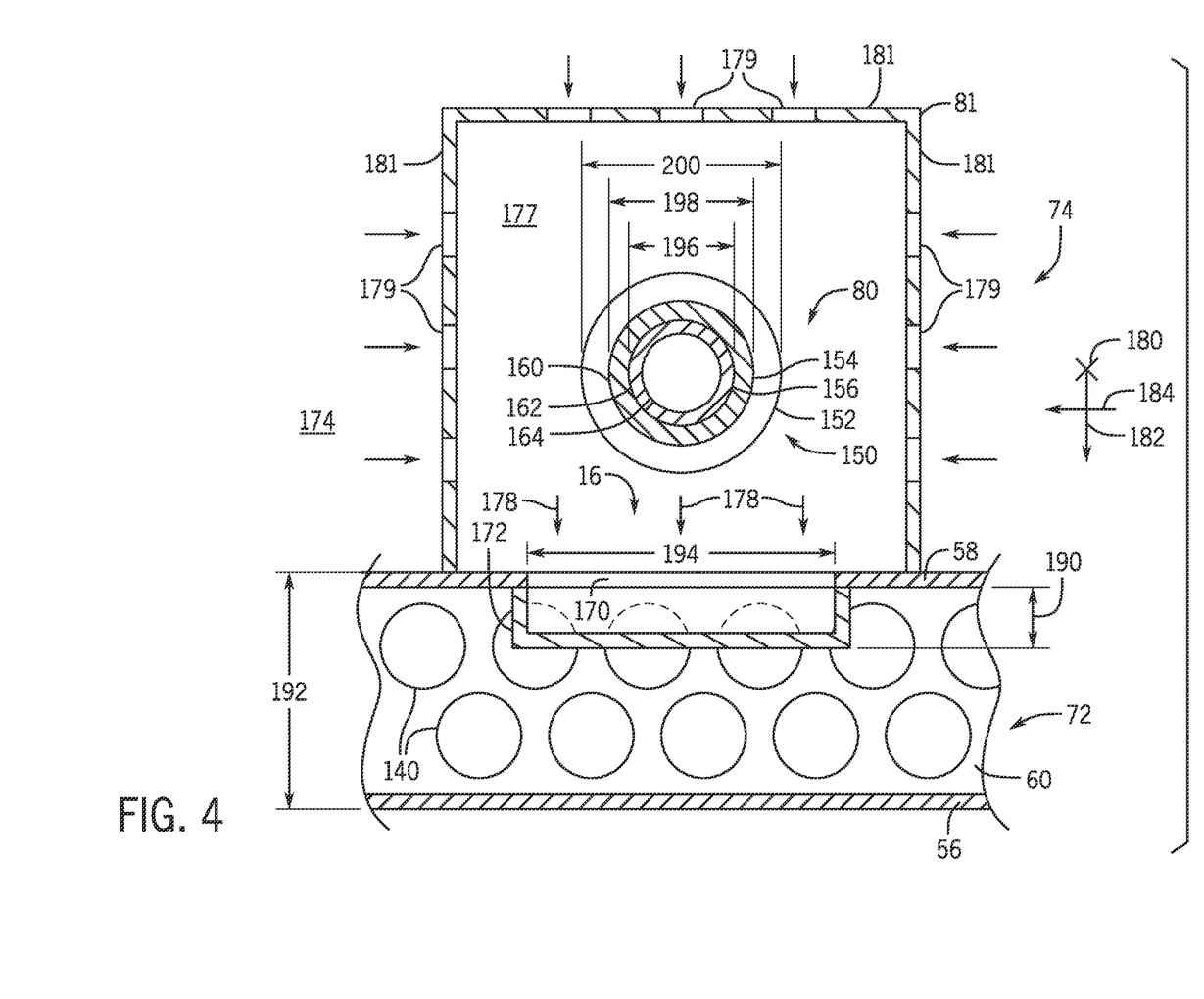
FIG. 4 is a schematic view taken within line 4-4 of FIG. 3, further illustrating details of the fuel conduit of the secondary fuel injection system and the sweep opening and sweep louver of the fuel sweep system.

FIG. 4 is a partial view of an embodiment of the combustor 26 of FIG. 3 taken within line 4-4, further illustrating details of the fuel sweep system 16 adjacent the fuel conduit 80 of the secondary fuel injection system 74. As illustrated, the fuel conduit 80 includes the multiple sections 150, including the bellows section 152, the conduit section 154, the conduit section 156, and the intermediate joints 160, 162, and 164. Each of these joints 160, 162, and 164 may potentially leak fuel into the chamber 174 of the compressor discharge casing 176 as discussed above. The fuel sweep system 16 and the hood 81 help to sweep (or urge flow of) the leaked fuel into the passage 60 between the liner 56 and the flow sleeve 68.

The hood 81 is disposed over the fuel conduit 80 and couples with the flow sleeve 58, thereby defining the flow passage 177 along the fuel conduit 80. Thus, the hood 81 helps to contain any fuel leaking from the fuel conduit 80 within the flow passage 177, rather than leaking into the chamber 174 of the compressor discharge casing 176. As discussed above, the hood 81 receives an airflow from the chamber 174 through one or more openings 179, which may be gaps at one or both axial ends of the hood 81 (e.g., axial end gaps), gaps between hood sections of the hood 81 (e.g., intermediate axial gaps), openings in one or more sidewalls 181 of the hood 81, or a combination thereof. For example, in embodiments with openings in the sidewalls 181, the hood 81 may include one or more openings 179 in each of the sidewalls 181. In the illustrated embodiment, the hood 81 includes three openings 179 (or rows of openings 179) in each of the three sidewalls 181. In embodiments with axial end gaps for openings 179, the axial end of the hood 81 may be entirely open or partially open (e.g., at least 25, 50, 75, or 90 percent open) in an axial, radial, and/or circumferential direction into the hood 81. The axial end gaps may be disposed at the wall 158, at the fuel nozzle 78, or a combination thereof. In embodiments with intermediate axial gaps for openings 179, the hood 81 may include a plurality of hood sections spaced apart from one another in the axial direction, thereby defining intermediate axial gaps. The openings 179 guide the airflow from the chamber 174 of the discharge casing 176 into the flow passage 177 of the hood 81, wherein the airflow then flows along the fuel conduit 80, entraining any leaked fuel, before subsequently entering the fuel sweep system 16.

Accordingly, the fuel sweep system 16 is configured to sweep, or generally urge a flow of, any leaked fuel into the passage 60 as indicated by arrows 178. As illustrated in FIG. 4, the inlet flow conditioner 72 has a plurality of the tubes 140 arranged in rows in the passage 60 between the liner 56 and the flow sleeve 58. The sweep louver 172 extends or protrudes radially inward from the flow sleeve 58 into the passage 60 toward the liner 56, partially overlapping at least one of the rows of tubes 140 (e.g., the radially outer row of tubes 140). In certain embodiments, a radial height 190 of the sweep louver 172 may be a percentage of a radial height 192 between the liner 56 and the flow sleeve 58. For example, the radial height 190 may be less than or equal to 5, 10, 15, 20, or 25 percent of the radial height 192.

In addition, in certain embodiments, a circumferential width 194 of the sweep opening 170 and the sweep louver 172 may be a certain percentage relative to one or more of a width or diameter 196 of the conduit section 156, a width or diameter 198 of the conduit section 154, or a width or diameter 200 of the bellows section. For example, the circumferential width 194 may be at least equal to or greater than 1.2, 1.3, 1.4, 1.5, 1.6, 1.7, 1.8, 1.9, 2.0, 2.5, 3.0, or more of the corresponding width or diameter 196, 198, or 200. Accordingly, the sweep opening 170 and the sweep louver 172 may extend laterally beyond the perimeters of the sections 150 in opposite circumferential directions 184. In other words, the sections 150 of the fuel conduit 80 may be centered over the sweep opening 170 and the sweep louver 172.

Figure 5:
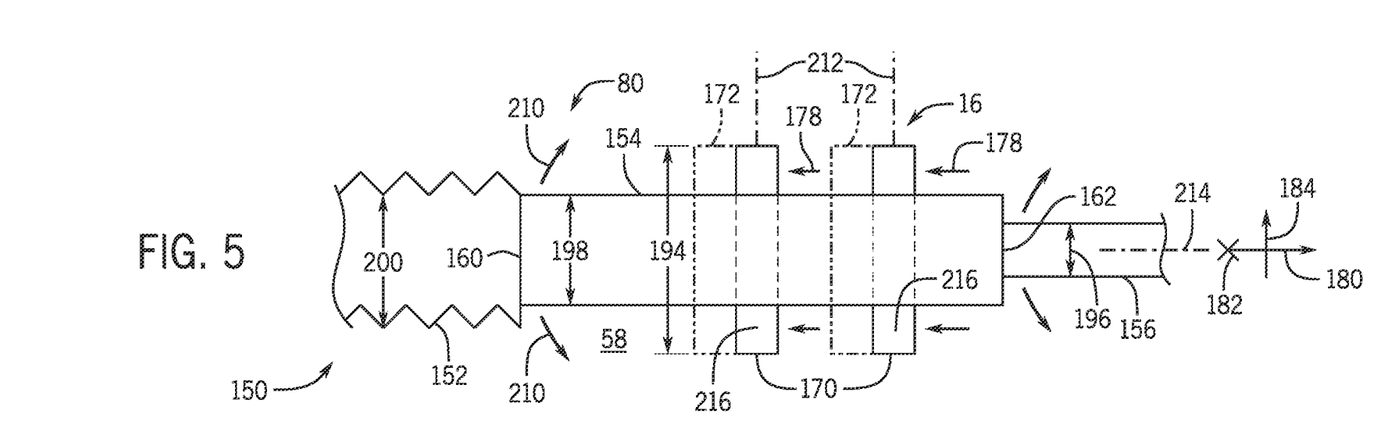
FIG. 5 is a schematic top view of an embodiment of the fuel sweep system disposed along the fuel conduit of the secondary fuel injection system.
Figure 6:
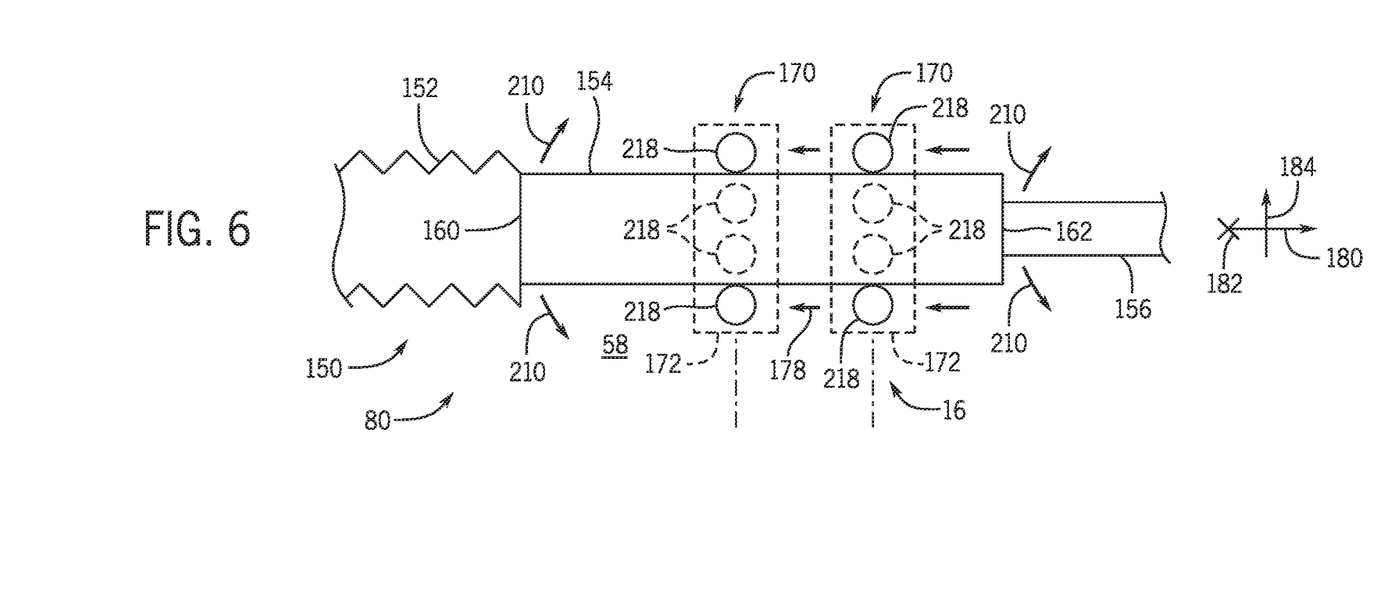
FIG. 6 is a schematic top view of an embodiment of the fuel sweep system disposed along the fuel conduit of the secondary fuel injection system.

FIGS. 5 and 6 are schematic top views of embodiments of the combustor 26, illustrating the fuel conduit 80 of the secondary fuel injection system 74 disposed radially above (i.e., radially outward of) the fuel sweep system 16 in the flow sleeve 58. As illustrated, the fuel conduit 80 includes various sections 150, which include the bellows section 152, the conduit section 154, and the conduit section 156 and the intermediate joints 160 and 162. As discussed above, fuel leakage may occur at the joints 160 and 162 as indicated by arrows 210. Accordingly, the fuel sweep system 16 is configured to direct (e.g., sweep or generally urge a flow of) the leaked fuel 210 into the passage 60 between the liner 56 and the flow sleeve 58, as indicated by arrows 178.

The fuel sweep system 16 includes the sweep openings 170 and the sweep louvers 172 disposed along the conduit 80. In particular, the sweep openings 170 and the sweep louvers 172 extend lengthwise along longitudinal axes 212, which are oriented crosswise relative to a longitudinal axis 214 of the fuel conduit 80. The longitudinal axis 214 may be aligned with (e.g., parallel to) a central longitudinal axis of the combustor 26, e.g., along the axial direction or axis 180. In the illustrated embodiment, the axes 212 of the sweep openings 170 and the sweep louvers 172 may be oriented perpendicular relative to the longitudinal axis 214. However, in certain embodiments, the axes 212 of the sweep openings 170 and the sweep louvers 172 may be oriented at an acute angle (e.g., 10, 20, 30, 40, 50, 60, 70, or 80 degrees) relative to the longitudinal axis 214. Additionally, the sweep openings 170 and the sweep louvers 172 may be substantially centered along the longitudinal axis 214, or the sweep openings 170 and sweep louvers 172 may be offset in one direction or the other in the circumferential direction 184 relative to the longitudinal axis 214.

The sweep openings 170 and the sweep louvers 172 may have dimensions and positions configured to help sweep, or generally urge a flow of, any leaked fuel into the passage 60. The sweep openings 170 and the sweep louvers 172 may have the same circumferential width. As discussed above, the sweep openings 170 and the sweep louvers 172 may have a circumferential width 194 relative to the widths or diameters 196, 198, and 200 of the sections 156, 154, and 152, respectively. As illustrated, the circumferential width 194 may be at least between 1.5 and 3 times the diameters or widths 196, 198, and 200 of the sections 156, 154, and 152. The sweep openings 170 and the sweep louvers 172 are shown axially between the joints 160 and 162. In some embodiments, the sweep openings 170 and the sweep louvers 172 may be disposed on one or both axial sides of each of the joints 160, 162, and 164. The illustrated fuel sweep system 16 includes two sets of sweep openings 170 and sweep louvers 172 for each fuel conduit 80. However, the fuel sweep system 16 may include 1, 2, 3, 4, 5, 6, 7, 8, 9, 10 or more sets of the sweep openings 170 and the sweep louvers 172 disposed at various locations along each fuel conduit 80, particularly at locations susceptible to potential fuel leaks.

In the embodiment of FIG. 5, the sweep openings 170 are continuous openings 216 disposed in the flow sleeve 58 and along the corresponding sweep louvers 172 in the circumferential direction 184 along the longitudinal axes 212. In other words, each sweep louver 172 of FIG. 5 has a single continuous sweep opening 170, 216 without any interruptions. The illustrated sweep openings 170, 216 are rectangular openings; however, the sweep openings 170, 216 may be oval openings, elongated openings with parallel sides and curved ends, or polygonal openings.

In contrast, in the embodiment of FIG. 6, the sweep openings 170 include a plurality of discrete openings 218 disposed in the flow sleeve 58 and associated with each of the sweep louvers 172. For example, the openings 170 associated with each louver 172 may include 2, 3, 4, 5, 6, 7, 8, 9, 10 or more of the discrete openings 218 disposed in a single row as shown or in multiple rows. In the illustrated embodiment, the sweep openings 170 for each sweep louver 172 include 4 of the discrete openings 218 in a single row. Additionally, the discrete openings 218 may include circular openings as shown or other shapes of openings, such as square openings, rectangular openings, oval openings, or any combination thereof. The discrete openings 218 also may include a two-dimensional arrangement of openings in both the circumferential direction 184 and the axial direction 180 (e.g., a plurality of rows of the discrete openings 218). In some embodiments, the fuel sweep system 16 may include a combination of the sweep openings 170 shown in FIGS. 5 and 6, such as different sets of sweep openings 170 and sweep louvers 172 at different axial positions along the fuel conduit 80.

Figure 7:
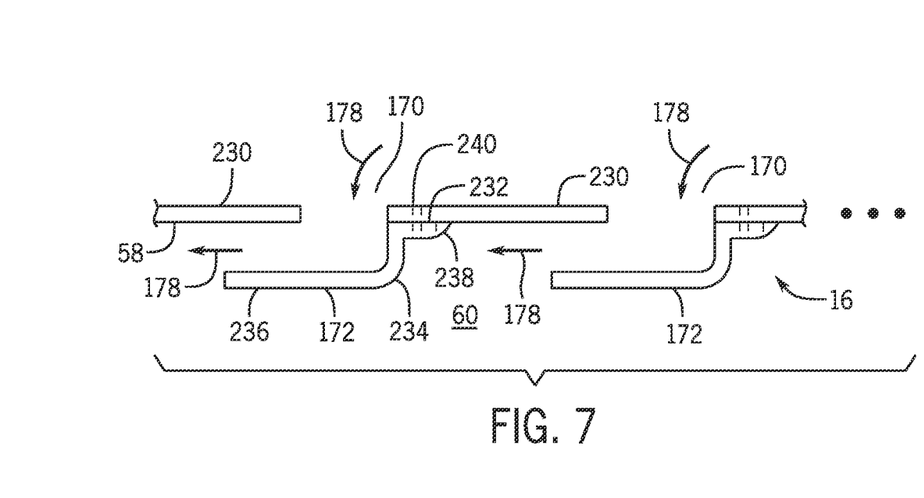
FIG. 7 is a partial schematic side view of an embodiment of the fuel sweep system, illustrating sweep louvers coupled to a flow sleeve and overlapping the sweep openings and a portion of the flow sleeve.

FIG. 7 is a schematic side view of an embodiment of the fuel sweep system 16, further illustrating details of the sweep openings 170 and the sweep louvers 172 coupled to the flow sleeve 58. As illustrated, the sweep openings 170 are disposed in the flow sleeve 58, and the sweep louvers 172 extend or overlap across the sweep openings 170 and an additional portion 230 of the flow sleeve 58. The sweep louvers 172 may include a flange or mounting portion 232, a radial portion or turning louver wall 234, and an axial portion or axial louver wall 236. The mounting portion 232 may be removably or fixedly coupled to the flow sleeve 58 via one or more fasteners or fixed joints, such as a joint 238 and/or a fastener 240. The joint 238 may include a welded joint and/or a brazed joint, while the fastener 240 may include a threaded fastener (e.g., male and female threaded fasteners), a rivet, a clamp, or another suitable removable connection. Thus, the sweep louver 172 of FIG. 7 is a separate component relative to the flow sleeve 58, and the sweep louver 172 is separately attached to the flow sleeve 58 via one or more joints or fasteners at the mounting portion 232. Although the mounting portion 232 is disposed in contact with the interior surface of the flow sleeve 58, it should be understood that the mounting portion 232 may be disposed instead in contact with the exterior surface of the flow sleeve 58.

The radial portion 234 extends or protrudes radially inward from the flow sleeve 58 into the passage 60, and may include a gradual turn (e.g., radial to axial direction) from the flow sleeve 58 to the axial portion 236. The axial portion 236 may extend in the axial direction 180 substantially parallel with the flow sleeve 58. In this manner, the sweep louver 172 may turn the flow of leaked fuel and air indicated by arrow 178 from the radial direction to the axial direction, and then direct the flow in the axial direction toward the inlet flow conditioner 72 as indicated by arrows 178. The overlap between the axial portion 236 and the additional portion 230 of the flow sleeve 58 also may facilitate straightening of the flow in the axial direction toward the inlet flow conditioner 72.

Figure 8:
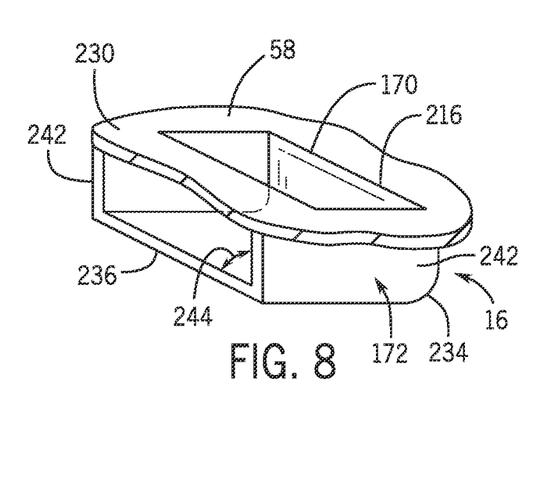
FIG. 8 is a schematic perspective view of a sweep opening and sweep louver as illustrated in FIG. 7.

FIG. 8 is a schematic perspective view of the fuel sweep system 16, illustrating details of one of the sweep openings 170 and sweep louvers 172 as illustrated in FIG. 7. As illustrated, the sweep louver 172 overlaps both the sweep opening 170 and the additional portion 230, and the sweep opening 170 is a continuous opening 216 (e.g., rectangular opening) as discussed above with reference to FIG. 5. As further illustrated in FIG. 8, the sweep louver 172 may include opposite sidewalls or louver side portions 242, which close off opposite sides of the sweep louver 172. The side portions 242 extend from the radial and axial portions 234 and 236 to the flow sleeve 58. The mounting portion 232 also extends along both of the side portions 242 to secure the opposite sides of the sweep louver 172 to the flow sleeve 58. The side portions 242 are oriented crosswise to the radial and axial portions 234 and 236, such as an angle 244. The angle 244 may be approximately 90 degrees, less than 90 degrees, or greater than 90 degrees. The side portions 242 may be flat or curved walls, such as concave or convex walls. In operation, the side portions 242 help to guide the airflow (including any leaked fuel) in the axial direction toward the inlet flow conditioner 72.

Figure 9:
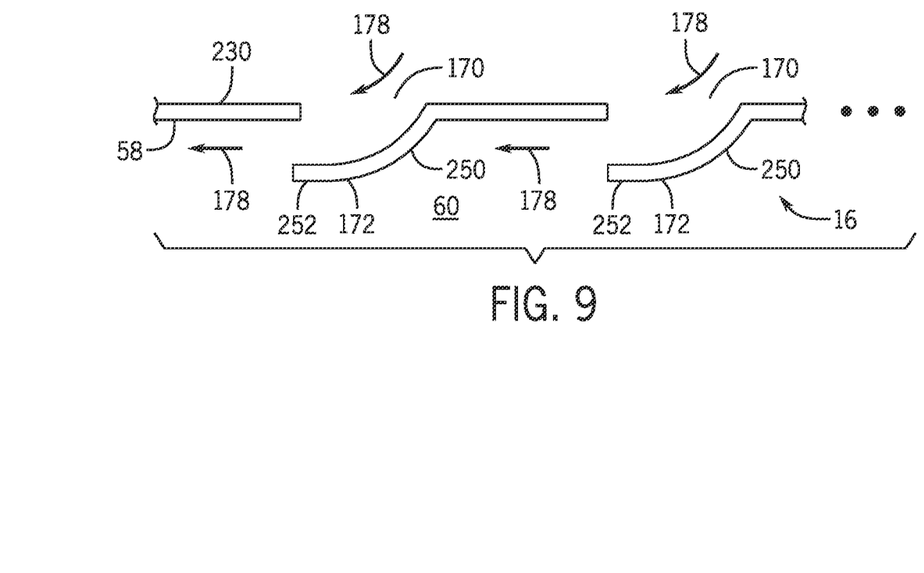
FIG. 9 is a partial schematic side view of an embodiment of the fuel sweep system, illustrating sweep louvers and sweep openings formed integrally with the flow sleeve.

FIG. 9 is a schematic side view of an embodiment of the fuel sweep system 16 coupled to the flow sleeve 58, further illustrating details of the sweep openings 170 and the sweep louvers 172. In the illustrated embodiment, the sweep louvers 172 are an integral portion of the flow sleeve 58 and are generally aligned with the sweep openings 170. For example, the sweep openings 170 and the sweep louvers 172 of FIG. 9 may be formed by punching (e.g., cutting and deforming) the flow sleeve 58 to simultaneously form the sweep openings 170 and the sweep louvers 172. As a result, the sweep louvers 172 extend continuously from the flow sleeve 58 without any intermediate joint (e.g., no weld, braze, or fasteners). The sweep louvers 172 of FIG. 9 overlap the sweep openings 170, but may not overlap an additional portion 230 as discussed above with reference to FIGS. 7 and 8.

In the illustrated embodiment, the sweep louvers 172 include a first portion 250 adjacent the flow sleeve 58 and a second portion 252 disposed further away from the flow sleeve 58. The first portion 250 is integrally connected or formed with the flow sleeve 58 and generally extends in a radially inward direction and partially turns in the axial direction. The second portion 252 is integrally formed with the first portion 250, and the second portion 252 further turns and extends into the axial direction. Accordingly, the portions 250 and 252 of the sweep louver 172 may gradually turn from a radial direction to an axial direction along the flow sleeve 58. In operation, the sweep openings 170 are configured to receive a leaked fuel, while sweep louvers 172 are configured to redirect a flow of the leaked fuel in the axial direction toward the inlet flow conditioner 72 as indicated by arrows 178.

Figure 10:
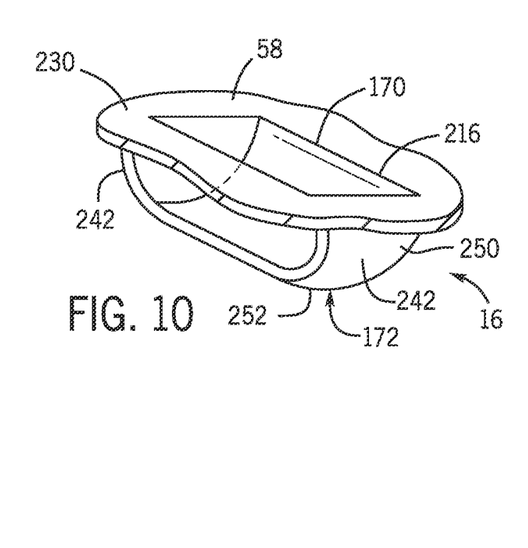
FIG. 10 is a schematic perspective view of a sweep opening and sweep louver as illustrated in FIG. 9.

FIG. 10 is a schematic perspective view of the fuel sweep system 16 of FIG. 9, further illustrating details of the sweep opening 170 and sweep louvers 172. As illustrated, the sweep louver 172 is substantially aligned with the sweep opening 170 without any additional overlap with an additional portion 230. The sweep louver 172 gradually turns from the radial direction to the axial direction to provide flow guidance in the axial direction to the inlet flow conditioner 72. The sweep opening 170 also has the continuous opening 216 as discussed above with reference to FIG. 5.

As further illustrated in FIG. 10, the sweep louver 172 includes the opposite sidewalls or louver side portions 242, which close off opposite sides of the sweep louver 172. The side portions 242 extend from the first and second portions 250 and 252 to the flow sleeve 58. The sweep louver 172, including the side portions 242 and the first and second portions 250 and 252, is integrally formed from the flow sleeve 58 (e.g., by punching, or by cutting and deforming). In the illustrated embodiment, the side portions 242 gradually curve between the flow sleeve 58 and the first and second portions 250 and 252. However, in some embodiments, the side portions 242 may be similar or the same as shown in FIG. 8. In operation, the side portions 242 help to guide the airflow (including any leaked fuel) in the axial direction toward the inlet flow conditioner 72.

As discussed above, the fuel sweep system 16 may include one or more sets of sweep openings 170 and sweep louvers 172 disposed at various positions along each fuel conduit 80 of the secondary fuel injection system 74. Each set of sweep openings 170 and sweep louvers 172 is configured to draw and direct a flow of leaked fuel from the fuel conduit 80 into the passage 60 between the liner 56 and the flow sleeve 58, thereby directing the leaked fuel into the chamber 64 of the head end portion 52, where the leaked fuel then flows through the fuel nozzles 66 into the combustion chamber 54. The fuel sweep system 16 is configured to direct any fuel leakage out of the chamber 174 of the compressor discharge casing 176 to avoid any risk of combustion in the chamber 174. The fuel sweep system 16 is configured to avoid problems with fuel leakage with or without fuel leakage monitors. However, in certain embodiments, a fuel leakage monitor also may be used to detect any fuel leakage in the location of the secondary fuel injection system 74.

Technical effects of the disclosed embodiments include fuel sweep systems and methods for sweeping fuel leaks from a fuel conduit along a combustor, particularly in the compressor discharge chamber. The fuel is swept into a passage between a flow sleeve and a liner of the combustor via one or more fuel sweep openings and fuel sweep louvers. Accordingly, if any fuel leaks in the compressor discharge chamber, the fuel leaks are directed into the passage, which then flows into the combustion chamber (e.g., through a head end of the combustor and fuel nozzles). The fuel leaks also may be partially contained and guided into the fuel sweep openings via a hood disposed over the fuel conduit. The disclosed fuel sweep systems and methods may be used with or without a fuel leak monitoring system. Additionally, by sweeping any fuel leaks into the passage, the disclosed fuel sweep systems and methods may avoid unscheduled downtime for the gas turbine system.

The subject matter described in detail above may be defined by one or more clauses, as set forth below.

A system includes a combustor having a combustion chamber, a liner disposed about the combustion chamber, a flow sleeve disposed about the liner, and a passage disposed between the liner and the flow sleeve, wherein the passage is in fluid communication with the combustion chamber. The system further includes a compressor discharge chamber disposed about the flow sleeve, a first fuel conduit disposed in the compressor discharge chamber along the flow sleeve, and a fuel sweep system. The fuel sweep system includes a first fuel sweep opening in the flow sleeve and a first fuel sweep louver coupled to the flow sleeve adjacent the first fuel sweep opening, wherein the first fuel sweep opening and the first fuel sweep louver are disposed radially inward relative to the first fuel conduit.

The system of the preceding clause, wherein the first fuel conduit includes one or more joints between adjacent sections of the first fuel conduit, and the fuel sweep system is configured to sweep a leaked fuel from the first fuel conduit into the passage.

The system of any preceding clause, wherein the first fuel conduit overlaps with the first fuel sweep opening and the first fuel sweep louver in an axial direction and a circumferential direction relative to a longitudinal axis of the combustor.

The system of any preceding clause, wherein the first fuel sweep opening and the first fuel sweep louver extend lengthwise along a first longitudinal axis oriented crosswise to a second longitudinal axis of the first fuel conduit.

The system of any preceding clause, wherein the first fuel sweep opening and the first fuel sweep louver extend lengthwise over a distance greater than a width of the first fuel conduit.

The system of any preceding clause, wherein the first fuel sweep louver protrudes into the passage.

The system of any preceding clause, wherein the first fuel sweep louver includes a turning portion.

The system of any preceding clause, wherein the first fuel sweep louver includes an axial portion extending axially along an interior surface of the flow sleeve.

The system of any preceding clause, wherein the first fuel conduit is coupled to a first fuel nozzle extending through the flow sleeve and the liner.

The system of any preceding clause, wherein the combustor includes an inlet flow conditioner having a plurality of tubes in the passage downstream from the fuel sweep system relative to a flow of air through the passage.

The system of any preceding clause, wherein the combustor includes a combustor portion and a head end portion; wherein the combustor portion includes the combustion chamber, the liner, the flow sleeve, and the passage; wherein the head end portion includes a plurality of primary fuel nozzles in a head end chamber; wherein the combustor includes a cap plate disposed between the head end chamber and the combustion chamber; wherein an air flow path extends from the compressor discharge chamber, through openings in the flow sleeve into the passage, along the passage to the head end chamber, and through the plurality of primary fuel nozzles into the combustion chamber.

The system of any preceding clause, wherein the combustor is a gas turbine combustor.

The system of any preceding clause, the system including a turbine downstream from the combustion chamber, and a compressor upstream from the compressor discharge chamber.

The system of any preceding clause, wherein the fuel sweep system includes a second fuel sweep opening in the flow sleeve and a second fuel sweep louver coupled to the flow sleeve adjacent the second fuel sweep opening, wherein the second fuel sweep opening and the second fuel sweep louver are disposed radially inward relative to the first fuel conduit.

The system of any preceding clause, the system including a second fuel conduit disposed in the compressor discharge chamber along the flow sleeve, wherein the fuel sweep system includes a second fuel sweep opening in the flow sleeve and a second fuel sweep louver coupled to the flow sleeve adjacent the second fuel sweep opening, wherein the second fuel sweep opening and the second fuel sweep louver are disposed radially inward relative to the second fuel conduit.

A system may include a fuel sweep system configured to couple to a flow sleeve of a combustor along a first fuel conduit, wherein the flow sleeve is configured to be disposed about a liner of the combustor, and the first fuel conduit is configured to extend along the flow sleeve in a compressor discharge chamber disposed about the flow sleeve. The fuel sweep system includes a first fuel sweep louver adjacent a first fuel sweep opening.

The system of the preceding clause, the system including the flow sleeve having the fuel sweep system, the combustor having the flow sleeve, a gas turbine system having the combustor, or a combination thereof.

The system of any preceding clause, wherein the fuel sweep system includes a second fuel sweep louver adjacent a second fuel sweep opening, wherein the second fuel sweep opening and the second fuel sweep louver are configured to couple to the flow sleeve along the first fuel conduit or a second fuel conduit in the compressor discharge chamber disposed about the flow sleeve.

A method may include directing a leaked fuel from a first fuel conduit through a first fuel sweep opening of a fuel sweep system into a passage between a liner and a flow sleeve of a combustor, wherein the liner is disposed about a combustion chamber, the flow sleeve is disposed about the liner, the passage is in fluid communication with the combustion chamber, a compressor discharge chamber is disposed about the flow sleeve, the first fuel conduit is disposed in the compressor discharge chamber along the flow sleeve, and the first fuel sweep opening is disposed in the flow sleeve. The method also may include directing the leaked fuel from the first fuel sweep opening in a flow direction along the passage via a first fuel sweep louver of the fuel sweep system, wherein the first fuel sweep louver is coupled to the flow sleeve adjacent the first fuel sweep opening, and the first fuel sweep opening and the first fuel sweep louver are disposed radially inward relative to the first fuel conduit.

The method of the preceding clause, wherein directing the leaked fuel from the first fuel sweep opening in the flow direction along the passage via the first fuel sweep louver includes guiding the leaked fuel via an axial portion of the first fuel sweep louver substantially parallel to the flow sleeve.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  a combustor, comprising:
    a combustion chamber;
    a liner disposed about the combustion chamber;
    a flow sleeve disposed about the liner; and
    a passage disposed between the liner and the flow sleeve, wherein the passage is in fluid communication with the combustion chamber;

a compressor discharge chamber disposed about the flow sleeve;

a first fuel conduit disposed in the compressor discharge chamber along the flow sleeve, wherein the first fuel conduit is offset from an exterior surface of the flow sleeve in a radial direction relative to a longitudinal axis of the combustor, and the first fuel conduit is configured to couple to and extend between a fuel supply and a first fuel nozzle; and a fuel sweep system configured to sweep a leaked fuel from the first fuel conduit into the passage, wherein the fuel sweep system comprises a first fuel sweep opening in the flow sleeve and a first fuel sweep louver coupled to the flow sleeve adjacent the first fuel sweep opening, the first fuel sweep opening and the first fuel sweep louver are disposed radially inward relative to the first fuel conduit, and the first fuel conduit overlaps with the first fuel sweep opening and the first fuel sweep louver along the flow sleeve in an axial direction and a circumferential direction relative to the longitudinal axis of the combustor;

wherein the first fuel conduit is centered over the first fuel sweep opening.

2. The system of claim 1, wherein the fuel sweep system comprises a hood disposed over the first fuel conduit, the first fuel sweep opening, and the first fuel sweep louver, wherein the hood is coupled to the flow sleeve outside of a boundary of the first fuel sweep opening such that the hood completely surrounds the first fuel sweep opening.

3. The system of claim 1, wherein a width of the first fuel sweep opening and the first fuel sweep louver along a first axis oriented crosswise to a central axis of the first fuel conduit is greater than a diameter of the first fuel conduit at least along a portion of the first fuel conduit overlapping with the first fuel sweep opening and the first fuel sweep louver.

4. The system of claim 1, wherein the first fuel sweep opening and the first fuel sweep louver extend laterally beyond a perimeter of the first fuel conduit in opposite first and second directions along a first axis oriented crosswise to a central axis of the first fuel conduit.

5. The system of claim 1, wherein the first fuel sweep louver protrudes into the passage.

6. The system of claim 5, wherein the first fuel sweep louver comprises a turning portion.

7. The system of claim 6, wherein the first fuel sweep louver comprises an axial portion extending axially along an interior surface of the flow sleeve, and the first fuel sweep louver extends from the flow sleeve over an axial distance that is at least half of an axial dimension of the first fuel sweep opening in the axial direction relative to the longitudinal axis of the combustor.

8. The system of claim 1, comprising the first fuel nozzle extending radially through the flow sleeve and the liner.

9. The system of claim 1, wherein the flow sleeve comprises a plurality of impingement openings configured to impinge a flow from the compressor discharge chamber onto the liner, wherein the fuel sweep system having the first fuel sweep opening and the first fuel sweep louver are structurally different from the plurality of impingement openings.

10. The system of claim 1, wherein the combustor comprises a combustor portion and a head end portion; wherein the combustor portion comprises the combustion chamber, the liner, the flow sleeve, and the passage; wherein the head end portion comprises a plurality of primary fuel nozzles in a head end chamber; wherein the combustor comprises a cap plate disposed between the head end chamber and the combustion chamber; wherein an air flow path extends from the compressor discharge chamber, through openings in the flow sleeve into the passage, along the passage to the head end chamber, and through the plurality of primary fuel nozzles into the combustion chamber, wherein the first fuel sweep louver extends from the flow sleeve into the passage toward the head end chamber.

11. The system of claim 1, wherein the combustor is a gas turbine combustor.

12. The system of claim 11, comprising a turbine downstream from the combustion chamber, and a compressor upstream from the compressor discharge chamber.

13. The system of claim 1, wherein the fuel sweep system comprises a second fuel sweep opening in the flow sleeve and a second fuel sweep louver coupled to the flow sleeve adjacent the second fuel sweep opening, the second fuel sweep opening and the second fuel sweep louver are disposed radially inward relative to the first fuel conduit, and the first fuel conduit overlaps with the second fuel sweep opening and the second fuel sweep louver in the axial direction and the circumferential direction relative to the longitudinal axis of the combustor.

14. The system of claim 1, comprising a second fuel conduit disposed in the compressor discharge chamber along the flow sleeve, wherein the second fuel conduit is offset from the exterior surface of the flow sleeve in the radial direction relative to the longitudinal axis of the combustor, the fuel sweep system comprises a second fuel sweep opening in the flow sleeve and a second fuel sweep louver coupled to the flow sleeve adjacent the second fuel sweep opening, the second fuel sweep opening and the second fuel sweep louver are disposed radially inward relative to the second fuel conduit, and the second fuel conduit overlaps with the second fuel sweep opening and the second fuel sweep louver in the axial direction and the circumferential direction relative to the longitudinal axis of the combustor.

15. A system, comprising:
a fuel sweep system configured to couple to a flow sleeve of a combustor along a first fuel conduit, wherein the flow sleeve is configured to be disposed about a liner of the combustor to define a passage, the first fuel conduit is configured to extend along the flow sleeve in a compressor discharge chamber disposed about the flow sleeve, the first fuel conduit is offset from an exterior surface of the flow sleeve in a radial direction relative to a longitudinal axis of the combustor, wherein the fuel sweep system comprises a first fuel sweep louver adjacent a first fuel sweep opening, the first fuel sweep opening and the first fuel sweep louver overlap the first fuel conduit in a circumferential direction and an axial direction relative to the longitudinal axis of the combustor, the first fuel conduit is centered over the first fuel sweep opening, and the fuel sweep system is configured to sweep a leaked fuel from the first fuel conduit into the passage.

16. The system of claim 15, comprising the flow sleeve having the fuel sweep system, the combustor having the flow sleeve, a gas turbine system having the combustor, or a combination thereof.

17. The system of claim 15, wherein the fuel sweep system comprises a second fuel sweep louver adjacent a second fuel sweep opening; wherein the second fuel sweep opening and the second fuel sweep louver are configured to couple to the flow sleeve along the first fuel conduit or a second fuel conduit in the compressor discharge chamber disposed about the flow sleeve.

18. A method, comprising:
directing a leaked fuel from a first fuel conduit through a first fuel sweep opening of a fuel sweep system into a passage between a liner and a flow sleeve of a combustor, wherein the liner is disposed about a combustion chamber, the flow sleeve is disposed about the liner, the passage is in fluid communication with the combustion chamber, a compressor discharge chamber is disposed about the flow sleeve, the first fuel conduit is disposed in the compressor discharge chamber along the flow sleeve, the first fuel conduit is offset from an exterior surface of the flow sleeve in a radial direction relative to a longitudinal axis of the combustor, the first fuel sweep opening is disposed in the flow sleeve, and the first fuel conduit is centered over the first fuel sweep opening; and
directing the leaked fuel from the first fuel sweep opening in a flow direction along the passage via a first fuel sweep louver of the fuel sweep system, wherein the first fuel sweep louver is coupled to the flow sleeve adjacent the first fuel sweep opening, the first fuel sweep opening and the first fuel sweep louver are disposed radially inward relative to the first fuel conduit, and the first fuel sweep opening and the first fuel sweep louver overlap the first fuel conduit in a circumferential direction and an axial direction relative to the longitudinal axis of the combustor.

19. The method of claim 18, wherein a width of the first fuel sweep opening and the first fuel sweep louver along a first axis oriented crosswise to a central axis of the first fuel conduit is greater than a diameter of the first fuel conduit at least along a portion of the first fuel conduit overlapping with the first fuel sweep opening and the first fuel sweep louver, wherein the first fuel sweep opening and the first fuel sweep louver extend laterally beyond a perimeter of the first fuel conduit in opposite first and second directions along the first axis.

* * * * *